Oct. 30, 1928.
R. H. STEVENS
1,689,563
FURNACE AND METHOD OF OPERATING THE SAME
Filed Sept. 2, 1921
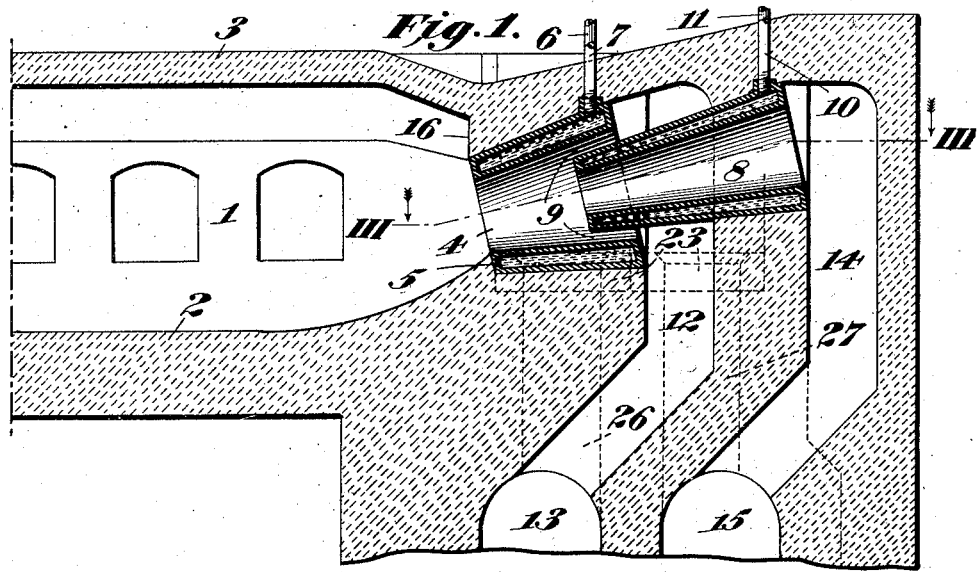
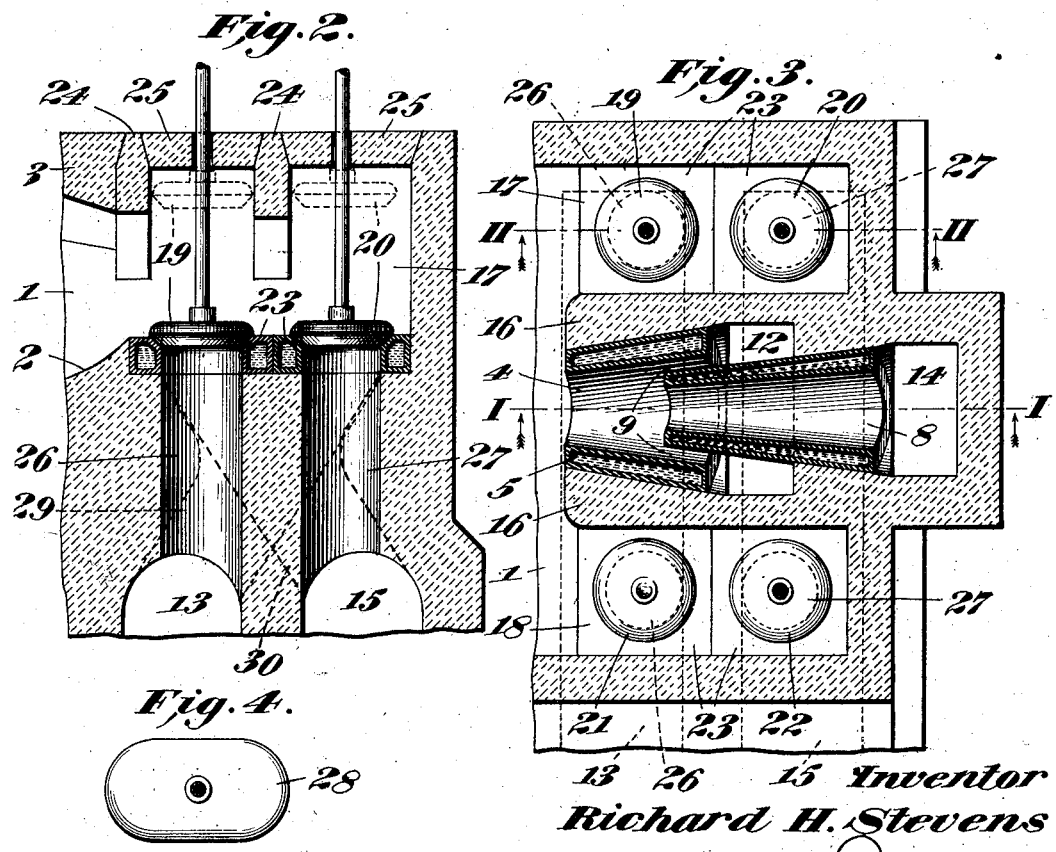
Inventor
Richard H. Stevens
By Geo. E. Thackray
Attorney Patented Oct. 30, 1928.

1,689,563

UNITED STATES PATENT OFFICE.

RICHARD H. STEVENS, OF MELROSE PARK, PENNSYLVANIA, ASSIGNOR TO BETHLEHEM STEEL COMPANY, A CORPORATION OF PENNSYLVANIA.

FURNACE AND METHOD OF OPERATING THE SAME.

Application filed September 2, 1921. Serial No. 497,814.

My invention relates to the construction of heating and melting furnaces, and is particularly adapted for use in connection with open hearth steel melting furnaces, but for the sake of simplicity of description and illustration I will refer to this latter type herein, but wish it understood that my invention is equally applicable to other forms of furnaces and for various uses.

My invention is particularly useful with furnaces which burn gases of different kinds, such as producer gas, natural gas, or coke oven gas, in connection with air for combustion thereof, but for the purpose of simplicity of description and illustration I will confine myself herein to the construction best adapted for the use of producer gas in connection with the air for the combustion thereof.

Heretofore the construction of furnaces has been such that only a limited amount of combustible could be introduced therein, owing to the low entering pressures or the low vacuum produced by the stack draft, with the result that such furnaces were slow working. Another difficulty with the prior types of furnaces was due to the fact that if they have a considerable amount of combustible gases introduced or forced therein in order to hasten their operation, the outgoing flame or products of combustion would extend over all or a large portion of the interior of the furnace with such high temperatures adjacent to the outgoing ports or blocks of the furnace, which are ordinarily made of refractory material, that these would become fused or partially fused or melted and destroyed and distorted to such an extent as to cause a blockade of the passage of the outgoing gases and also cause imperfect entrance of the gases, leading to improper distribution of the flame with a destructive effect upon the roof, ports and other parts of the furnace and without proper effect on the charge contained therein.

My invention is particularly applicable to the regenerative or recuperative types of furnace, and as such furnaces are quite similar I will confine my description to the regenerative type.

In order to avoid the difficulties above mentioned, I provide near the end of the furnace a combined entrance port, preferably surrounded by a water-cooled metallic construction somewhat resembling a tuyère, either conical, square, or with straight sides and arched top, or in fact any form that may be required. This combined entrance port is adapted to receive a mixture of air and combustible gases and deliver same to the furnace, preferably in a direction slightly inclined downwardly so as to transmit the heat to the hearth for the purpose of fusing or melting as customary and also to transmit heat to the charge. This style of port is one form of so-called blow-pipe port, in which the gases are mixed in one port before issuing into the furnace, this port being of the aspirating type as mentioned herein.

In connection with the combined entrance port I provide another and somewhat similar port, also preferably water-cooled, and in the shape of a smaller tuyère, the end of which is adjacent to or extends within the rear end of the first-mentioned combined entrance port, with considerable space between the two, and I introduce either gas or air into the last mentioned port or tuyère under such pressure as may be necessary, while in the other port gas or air may be supplied to the end thereof or to the annular space between the two ports or tuyères, and I arrange the entrance gas pressure in the smaller rear port or tuyère so that it is greater than the pressure in the larger combined port, thereby causing an aspirating or suction effect, which sucks one of the gases between the two tuyères, after which a mixture of the same is caused in the combined entrance port or tuyère before said mixture is delivered to the furnace, thus resulting in an intense flame properly directed.

The tuyères and ports in question are connected by suitable flues or channels with the regenerators, from which said gases are delivered in heated condition, and while these entrance tuyères or ports are of comparatively small size, they are sufficient to supply the proper amount of combustibles to the furnace in operation under the pressures used.

In addition to these entrance ports or tuyères I also provide, near the ends of the furnace, outlets which are of large size and area as compared with the entering port, which outlets are closed at that end of the furnace into which the gases are introduced, but are opened at the outgoing end in order to allow the products of combustion to pass off quickly and readily, thereby not piling up pressure in the furnace, which would limit the amount of combustibles passing through the same and thereby restrict the operation. These outlet passages are controlled by valves of the water-cooled mush-room type, but these valves may be of other types to accomplish the same purpose.

When the flow of gases in the furnace is reversed these valves are opened at the outlet end and allow the largest part of the products of combustion to pass through these into the connecting flues and thence to the slag pockets, if such are used, and thence into the regenerators for the purpose of heating them and conserving the heat, as is customary, and on account of the large size of these outlets practically all of the outgoing gases of combustion will be carried out through the flues connected with these valves.

In the type of furnace illustrated I provide two regenerators at each end, one for air and one for gas, and they are connected with the ports and also provided with flues in any of the usual manners leading to reversing valves, which reverse the flow of gases in the regenerators and ports as customary, and these are also provided with control valves, dampers, stack flues and stack for the ultimate disposition of the products of combustion, but these are not illustrated, as they may be arranged in various manners customary for such constructions.

Having thus given a general description of my invention, I will now, in order to make the matter more clear, refer to the annexed sheet of drawings, which forms part of this specification and in which like characters refer to like parts:

Figure 1 is a vertical sectional elevation of the end of an open hearth furnace taken on the line I—I of Figure 3; Figure 2 is a vertical sectional elevation through the side of the end of the furnace taken on the line II—II of Figure 3; Figure 3 is a horizontal sectional elevation of the end of the furnace taken on the line III—III of Figure 1, and Figure 4 is a plan view of an elongated type of mush-room valve, which may take the place of two valves illustrated in Figures 2 and 3 and which would give an equivalent area.

Referring now to the characters of reference on the drawings: 1 indicates the body of the furnace in general; 2 the hearth thereof and 3 is the roof. 4 is a combined entrance port provided with a water-cooled lining or tuyère 5, provided with entrance or outlet pipes 6 and 7, respectively, for the introduction and discharge of water for the purpose of cooling the same. 8 is my rear tuyère or port similar in form to but of smaller diameter than the combined entrance tuyère 4, and with its end inserted within the rear portion of the same, thereby providing an annular opening between them, this tuyère or port 8 also being provided with entrance and exit pipes 10 and 11 for supplying water thereto and discharging same therefrom for the purpose of keeping it cool and maintaining its form. The annular space 9 between the two tuyères connects with the flue 12 and this in turn connects with the flue or slag pocket 13, which is connected with one of the regenerators at the end of the furnace. The tuyère or port 8 connects with the flue 14, which connects with the flue or slag pocket 15, which connects with the other regenerator at this end of the furnace. The forward entrance port or tuyère 4 may be surrounded with brick or other refractory material 16 in order to hold it in position and to provide side ports as illustrated. I provide side ports 17 and 18 on each side of my entrance ports or tuyères in which I mount mush-room controlling valves 19, 20, 21 and 22, which preferably have water cooled seats 23 provided with cooling pipes connected thereto (not shown). The upper portion of the outgoing ports 17 and 18 are provided with walls 24 as illustrated, which form pockets in connection with that portion of the roof structure 25, so that when the valves are in raised position, as indicated by dotted lines, they are protected from contact with the outgoing gases and thereby maintained in good condition. The valve 19 controls the passage to the flue 26, which connects with the flue or slag pocket 13, previously mentioned, which in turn connects with one of the regenerators at this end of the furnace, while a similar valve 20 controls the flue or passage 27, which connects with the flue or slag pocket 15, previously mentioned, and which connects with the other regenerator at this end of the furnace. The valve 21 also connects with a passage similar to 26 and thence to the flue or slag pocket 13 and thence to the regenerator, while the valve 22 connects to a flue corresponding to 27, which connects with the flue or slag pocket 15 and thence to the other regenerator.

As illustrated in Figure 4, 28 is a valve of poppet type, which may take the place of the two valves 19 and 20 or of the two valves 21 and 22, and control an area of flue equal to the combined areas controlled by the two valves.

It should be noted that the area of the inlet port 4, while sufficient for supplying a mixture of combustible gases to the furnace, is of much less area than the combined areas of the channels 26 and 27 and the corresponding ones on the other side of the furnace, through which the outgoing gases are passed, so that the outlets controlled by valves 19, 20, 21 and 22 will amply permit the products of combustion to pass easily to the regenerators on account of the great area of the outlet passages, leaving little or no products of combustion to pass through the entrance or tuyère ports 5 and 8, thereby preserving these from destruction, thereby allowing sufficient gases to enter the furnace and depart therefrom readily in order to accomplish quick working without destroying the end construction.

I may use my construction in various ways, for example:—air previously heated may be delivered from the regenerator into the flue or slag pocket 15 and thence through the flue 14 and into the entrance tuyère or port 8, and this air may be delivered under considerable pressure by a fan or blower, furnishing a fraction of an inch to several inches of water pressure. Gas may also be delivered through its regenerator, thence to the flue or slag pocket 13 and thence to the flue 12 and enters the annular space 9 between the entrance tuyères or ports 5 and 8, and by reason of the pressure in 8 an aspirating effect causes an influx of the gas therethrough, which mixes with the air in the port or tuyere 5 and thence into the furnace through the opening 4 for prompt and thorough combustion. While this is going on the valves 19, 20, 21 and 22 at the same end of the furnace are closed, while corresponding valves at the other end of the furnace are open, so that the products of combustion will pass downwardly through the flues 26 and 27 and other companion flues at the outgoing end and thence to the regenerators to heat them in preparation for the next reversal of gases.

I wish it understood that my construction depends substantially upon delivering the products of combustion or waste gases from the furnace chamber through the side outlets to the regenerators at the ends of the furnace for the purpose of heating them, prior to reversal, and I do not depend upon the passage of these gases outwardly from my entrance port for this purpose, and my construction is so designed that little or no waste gases issue from the furnace through said entrance port, which also prevents the destruction thereof as previously explained. My entrance port is a fixed burner of definite size and proportions, which is designed for the purpose of supplying mixed gases to the furnace hearth for proper combustion therein.

Although I have described combustible gases as delivered through the channel 12 and air through the channel 14, I may reverse this procedure and deliver combustible gases through the flue 14 and air through the flue 12, thus making the tuyère or port 8 the first gas entrance and the rear of port 4 or the annular space 9 the first air entrance, in which case the air is introduced outside of the gas instead of as previously mentioned.

I may operate the furnace with the ports and passages constructed according to my invention by causing either air or combustible gas to be delivered to and through the rear tuyère 8 at a higher pressure than the other gas which enters the space 9 between the tuyères, or I may accomplish the same purpose by causing the air or combustible to enter the annular space 9 between the two tuyères and to be delivered thereto at a higher pressure than the other gas which is delivered to the rear tuyère, thus producing an aspirating effect in either case.

If I use the longer type of valve 28 to control a larger passage then there will be only one outlet flue leading from each of the two valves 28, one of which will lead to the air regenerator and the other to the gas regenerator, these flues being as indicated by the dotted and dash lines 29 and 30, respectively.

In referring to air and combustible gases herein, I use the term gas generically to indicate either of these.

I also wish it understood that my arrangement of ports and flues is such that I provide at least two outlet valves at each end of the furnace, one of which controls a flue leading to the air regenerator at that end and the other controls a flue leading to the gas regenerator at that end, which thereby insures delivery of the hot products of combustion in proper quantity to each regenerator to heat it as necessary, without depending upon the delivery of products of combustion from the entrance ports to the regenerators. This is a particular, novel and useful feature of my invention.

Although I have described and illustrated my invention in considerable detail, I do not wish to be limited to the exact and specific details thereof, as shown and described, but may use such modifications in, substitutions for, or equivalents thereof as are embraced within the scope of my invention, or as pointed out in the claims.

Having thus described my invention, what I claim and desire to secure by Letters Patent is:—

1. An open hearth furnace entrance port of tuyère construction, a flue connecting the rear end thereof to a regenerator, another port of tuyère construction the forward end of which projects within the rear end of the first-mentioned port and provided with a flue connection to another regenerator, means for controlling the flow of gases to said ports, and additional openings near the furnace end to said regenerators controlled by valves.

2. In an open hearth furnace, a port adapted to convey combined gases into said furnace, the rear end of which is provided with connection to a regenerator, another port adapted to deliver gas to the rear end of the first-mentioned port, provided with a flue connection to another regenerator, said ports being of tuyère-like construction and provided with cooling means, and two or more additional openings at the furnace ends leading to the regenerators and controlled by valves.

3. In a furnace, a combined entrance port connected to a regenerator and adapted to convey mixed gases into the furnace, another port connected to another regenerator and adapted to deliver gas to the combined entrance port, said ports being provided with cooling means to maintain their form, and at least two additional openings near the furnace ends of considerably greater area than that of the entrance port, said openings being connected to the air and to the gas regenerators, and controlled by valves.

4. In an open hearth furnace, a water-cooled gas port, air uptakes, air ports leading from said uptakes adjacent the gas port, the air ports extending below the gas ports, and adapted to discharge an air stream enclosing the gas stream, and supplemental passages connecting the air uptakes and the furnace chamber.

5. In an open hearth furnace, a gas port, air uptakes, air ports leading from said uptakes adjacent the gas port and adapted to discharge an air stream enclosing the gas stream, and supplemental passages connecting the air uptakes and the furnace chamber, said passages being provided with means adapted to selectively interrupt flow therethrough.

In witness whereof I hereunto affix my signature.

RICHARD H. STEVENS.